Dec. 4, 1923.
H. S. W. FIRMINGER
1,476,603
CHAIN BELT FOR DRIVING PURPOSES
Filed April 16, 1923
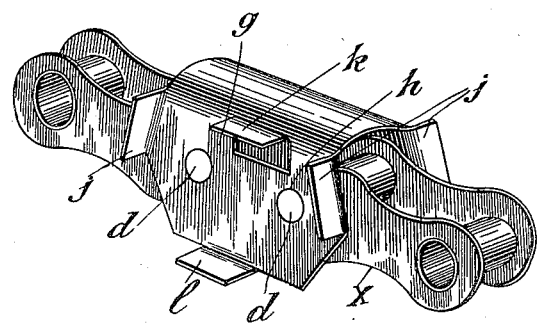
Fig.1.
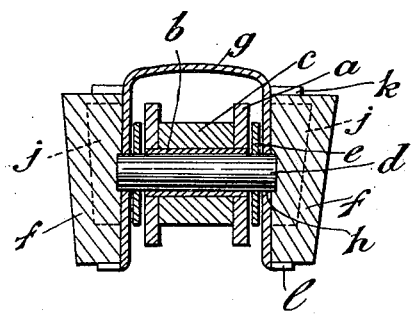 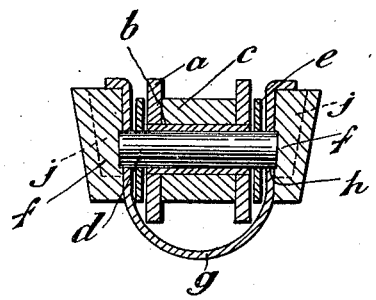
Fig.2.   Fig.3.
Inventor.
Harold Stuart Hortley Firminger,
By B. Singer, Atty.

Patented Dec. 4, 1923.

1,476,603

UNITED STATES PATENT OFFICE.

HAROLD STUART WORTLEY FIRMINGER, OF LONDON, ENGLAND.

CHAIN BELT FOR DRIVING PURPOSES.

Application filed April 16, 1923. Serial No. 632,470.

*To all whom it may concern:*

Be it known that I, HAROLD STUART WORTLEY FIRMINGER, a subject of the King of Great Britain, and a resident of Harlesden, London, England, have invented a certain new and useful Improvement in or Relating to Chain Belts for Driving Purposes, of which the following is a specification.

This invention is for improvements in or relating to chain-belts for driving purposes of the kind in which a plurality of belt elements are secured to a standard chain, that is, a chain which has no special fitments to assist such securement.

In such belts of this kind as have been heretofore proposed the securement of the belt elements to the standard chain has involved somewhat costly and complicated structures and it is the object of the present invention to do away with such structures and substitute securing means for the belt elements which will be eminently simple and inexpensive.

As is well known the pins connecting the links of most standard chains according to modern practice have their opposite ends projecting beyond the side plates of the chain, these ends not being riveted over for retaining the pins in situ but being unperceptibly expanded by means of the light application of a centre punch. In accordance with my invention I make use of these projecting ends, as they are, for securing the belt elements to the chain, the invention consisting essentially in the arrangement according to which a plurality of substantially U section elements straddling the standard chain are secured thereto each by engagement of its two sides respectively with opposite projecting ends of the chain pins, said elements being retained in situ by virtue of their own strength preventing the spreading and consequent disengagement of the said sides from said pins.

Certain embodiments of the invention are illustrated in the accompanying drawings and the same will now be described it being understood that the particular constructions shown are susceptible of various modifications without departing from the scope of the appended claims.

In these drawings:—

Fig. 1 is a perspective view with the friction elements removed of an embodiment of the invention which may be used to drive either on sprocket wheels or V pulleys or from one to the other.

Fig. 2 is an end elevation of the same sectioned in the plane of one of the pins of the cycle chain.

Fig. 3 is a similar section end elevation of a slight modification adapted only to drive from one V belt to another or from one sprocket wheel to another.

Throughout all these figures corresponding parts have like reference letters appended thereto. Describing first the embodiment illustrated in Figs. 1 and 2 *a*, *b*, and *c* are respectively the side plates, bearing bushes, and rollers, of the inner combinations of the cycle chain and *d* and *e* are respectively the connecting pins and outer plates of said cycle chain. The friction elements in this embodiment are adapted to be attached to said cycle chain by means of a U section member *g* provided with holes *h* adapted to register with and when sprung into the position illustrated to be engaged by the ends of the connecting pins *d* which extend beyond the outer plates of the cycle chain. This member *g* is made of spring steel and is adapted to resist displacement and accordingly retain itself in situ upon the said pins *d* by virtue of its own strength.

The friction elements *f* are shown as being adapted to be held between tongues *j*, *k* and *l* on said member *g* but they may be secured to the two side faces of the member *g* in any desired manner.

Thus rubber friction elements might be moulded into projections formed on said side faces. If desired a small tongue or indent extending inwardly from the inner faces of the member *g* may be provided for engaging with the neck of the outer plates *e* at points such as that marked X in Fig. 1, in order to preclude the possibility of the members *g* from inadvertently slipping from the chain should the holes *h* become disengaged from the pins *d*.

The manner in which the belt is to be applied on the V pulley or sprocket wheel is obvious and is not deemed to require description.

Turning now to the embodiment illustrated in Fig. 3 this differs from that shown in Figs. 1 and 2 chiefly in that the friction elements *f* are reversed with respect to the member *g* so that the belt cannot be used to drive from a sprocket wheel to a V pulley or vice versa.

It will be observed however that, as well as for driving from one V pulley to another, the belt could still be used, as a chain for driving from one sprocket wheel to another.

The primary advantage which this belt has over that previously described resides in the fact that its construction for reasons which will be obvious from the drawings permits of smaller overall dimensions of the finished article. In both the embodiments just described a slight difficulty presents itself in the application of the U shaped member *g* and friction elements *f* to the ordinary standard connecting link for joining the ends of the chain. This link, as will be well known by those familiar with the art, comprises a combination of two of the outer plates *e* and two of the connecting pins *d*, one of the plates being permanently fastened in situ on the pins and the other being passed onto the pins and being retained thereupon by means of a light spring clip adapted to engage in recesses near the ends of the pins, the pins being extended for this purpose beyond the normal length. By removing and replacing this clip and movable side plate it is obvious that the two ends of a chain can be connected together. Such connecting link however owing to its greater breadth would not be suitable for attachment thereto of the U shaped member *g* and friction elements *f* and I overcome this difficulty by simply removing the spring clip and grinding the ends of the pins until the same are of normal length. The process of joining then consists simply in the removal of the movable plate of the connecting link, the inter-linking of the ends of the chain in the pins of the connecting link, the replacement of said movable plate and the application in the ordinary manner of my U shaped member *g* and friction elements *f*.

The friction elements may be of any material either rubber, leather or the material known by the registered trade-mark "Ferodo" or a separate friction element may be dispensed with, the plates or U section members constituting the friction elements of a metal to metal drive.

What I claim and desire to secure by Letters Patent is:—

1. A chain belt comprising a standard chain consisting of chain elements and pins pivotally connecting said elements together and a plurality of metallic elements of substantially U section straddling and secured thereto, each by engagement of its two sides respectively with opposite projecting ends of the chain pins. said metallic elements being retained in situ by virtue of their own strength preventing the spreading and consequent disengagement of the said sides from said pins.

2. A chain belt comprising a standard chain consisting of chain elements and pins pivotally connecting said elements together and a plurality of metallic plates of substantially U section having holes in the sides thereof adapted to register with opposite projecting ends of the chain pins whereby said plates are adapted to be clipped on to said projecting ends by virtue of their own elasticity.

3. A chain belt comprising a standard chain consisting of chain elements and pins pivotally connecting said elements together, a plurality of metallic plates of substantially U section having holes in the sides thereof adapted to register with opposite projecting ends of the chain pins whereby said plates are adapted to be clipped on to said projecting ends by virtue of their own elasticity, and pads of some friction material secured respectively to the outsides of said sides of said metallic plates.

In witness whereof I affix my signature.

HAROLD STUART WORTLEY FIRMINGER.